United States Patent
Gopalan et al.

(10) Patent No.: US 9,379,791 B2
(45) Date of Patent: Jun. 28, 2016

(54) MULTIPLE INPUT MULTIPLE OUTPUT (MIMO) COMMUNICATION SYSTEMS AND METHODS FOR CHIP TO CHIP AND INTRACHIP COMMUNICATION

(71) Applicant: QUALCOMM Incorporated, San Diego, CA (US)

(72) Inventors: RaviKiran Gopalan, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/490,818

(22) Filed: Sep. 19, 2014

(65) Prior Publication Data
US 2016/0036501 A1    Feb. 4, 2016

Related U.S. Application Data

(60) Provisional application No. 62/032,027, filed on Aug. 1, 2014.

(51) Int. Cl.
*H04B 7/02* (2006.01)
*H04B 7/04* (2006.01)
(Continued)

(52) U.S. Cl.
CPC .......... *H04B 7/0413* (2013.01); *G06F 13/4204* (2013.01); *H04B 7/00* (2013.01); *H04B 7/0626* (2013.01); *H04B 15/00* (2013.01); *G06F 2213/0038* (2013.01)

(58) Field of Classification Search
CPC .. H04L 1/0009; H04L 1/0675; H04B 7/0478; H04B 7/02
USPC .................. 375/267, 299, 347, 349, 219–222
See application file for complete search history.

(56) References Cited

U.S. PATENT DOCUMENTS

| | | | |
|---|---|---|---|
| 7,260,153 B2 * | 8/2007 | Nissani (Nissensohn) | ...... H04L 25/0242 342/378 |
| 7,420,916 B2 | 9/2008 | Zhang et al. | |

(Continued)

FOREIGN PATENT DOCUMENTS

| | | |
|---|---|---|
| CN | 103378888 A | 10/2013 |
| EP | 2061160 A1 | 5/2009 |
| EP | 2481163 A1 | 8/2012 |

OTHER PUBLICATIONS

Bichan, Mike, "Crosstalk-Aware Transmitter Pulse-Shaping for Parallel Chip-to-Chip Links," Thesis for Master of Applied Science, Graduate Department of Electrical and Computer Engineering, University of Toronto, Copyright 2006, 83 pages.

(Continued)

*Primary Examiner* — Emmanuel Bayard
(74) *Attorney, Agent, or Firm* — Withrow & Terranova, PLLC (57) ABSTRACT

Multiple input multiple output (MIMO) communication systems and methods for chip to chip and intrachip communication are disclosed. In one aspect, MIMO techniques that have been applied to wireless communication systems are applied to interchip and intrachip communication systems. In particular, a transfer function is applied at the transmitter, and a reverse transfer function is applied at the receiver. The transfer function dynamically changes based on channel conditions to cancel or otherwise mitigate electromagnetic interference (EMI) and crosstalk conditions. In an exemplary aspect, a sum of power levels across the channels may have a maximum. To abide by such power level constraint, the transfer function may be optimized to reduce interference while remaining within the power level constraint.

24 Claims, 6 Drawing Sheets

(51) Int. Cl.
*H04B 7/06* (2006.01)
*H04B 15/00* (2006.01)
*G06F 13/42* (2006.01)
*H04B 7/00* (2006.01)

(56) References Cited

U.S. PATENT DOCUMENTS

| | | | |
|---|---|---|---|
| 7,483,480 B2 | 1/2009 | Guo et al. | |
| 7,680,461 B2* | 3/2010 | Takano | H04B 7/0615 370/328 |
| 7,773,685 B2* | 8/2010 | Tirkkonen | H04L 1/0009 375/267 |
| 8,107,983 B2* | 1/2012 | Zangi | H04B 7/024 375/267 |
| 8,233,556 B2* | 7/2012 | Waters | H01Q 3/2605 375/231 |
| 8,249,186 B2 | 8/2012 | Koo et al. | |
| 8,345,789 B2* | 1/2013 | Ruscitto | H04B 7/0874 375/267 |
| 8,384,596 B2 | 2/2013 | Rofougaran et al. | |
| 8,401,598 B2 | 3/2013 | Rofougaran et al. | |
| 8,456,374 B1* | 6/2013 | Bagley | H01Q 9/28 343/795 |
| 8,467,467 B2* | 6/2013 | Lee | H04B 7/0443 375/219 |
| 8,472,543 B2* | 6/2013 | Ariyavisitakul | H04B 7/0854 370/203 |
| 8,483,310 B2* | 7/2013 | Coldrey | H04B 7/0426 375/259 |
| 8,553,521 B2 | 10/2013 | Zhang et al. | |
| 8,621,405 B2* | 12/2013 | Iyer | G06F 17/5031 716/108 |
| 8,750,788 B2* | 6/2014 | Kim | H04B 7/15592 455/7 |
| 8,767,657 B1 | 7/2014 | Dehghan et al. | |
| 8,831,118 B2* | 9/2014 | Takano | H04L 25/0204 370/310 |
| 2004/0171359 A1* | 9/2004 | Tirkkonen | H04L 1/0066 455/127.1 |
| 2005/0075080 A1 | 4/2005 | Zhang | |
| 2006/0172719 A1 | 8/2006 | Chen et al. | |
| 2006/0285606 A1* | 12/2006 | Khojastepour | H04L 1/0675 375/267 |
| 2009/0225889 A1 | 9/2009 | Tsai et al. | |
| 2009/0268834 A1* | 10/2009 | Ariyavisitakul | H04B 7/0854 375/262 |
| 2011/0182336 A1* | 7/2011 | Chin | H04B 7/0854 375/224 |
| 2011/0183630 A1 | 7/2011 | Rofougaran et al. | |
| 2011/0268225 A1 | 11/2011 | Cronie et al. | |
| 2011/0286457 A1* | 11/2011 | Ee | H04L 45/00 370/392 |
| 2012/0008663 A1 | 1/2012 | Schilling | |
| 2012/0063531 A1* | 3/2012 | Ginis | H04B 3/487 375/285 |
| 2012/0287974 A1* | 11/2012 | Muralidhar | H04L 25/022 375/219 |
| 2013/0243046 A1 | 9/2013 | Vetterli et al. | |
| 2014/0071851 A1* | 3/2014 | Plainchault | H04B 7/024 370/254 |
| 2015/0146646 A1* | 5/2015 | Chen | H04L 5/0073 370/329 |
| 2015/0236769 A1* | 8/2015 | Alexiou | H04B 7/0478 375/267 |
| 2016/0087697 A1 | 3/2016 | Gopalan | |

OTHER PUBLICATIONS

Milosevic, Pavle et al., "Design of a 12Gb/s Transceiver for High-Density Links with Discontinuities using Modal Signaling," IEEE 20th Conference on Electrical Performance of Electronic Packaging and Systems (EPEPS), Oct. 23-26, 2011, San Jose, California, IEEE, pp. 215-218.

Palermo, Samuel, "Chapter 9: High-Speed Serial I/O Design for Channel-Limited and Power-Constrained Systems," CMOS Nanoelectronics Analog and RF VLSI Circuits, Jun. 27, 2011, pp. 287-334 (51 total pages), McGraw-Hill.

Sham, Kin-Joe, "Crosstalk Mitigation Techniques in High-Speed Serial Links," Thesis for Doctor of Philosophy, University of Minnesota, Apr. 2009, 144 Pages.

Gopalan, Ravikiran, et al., "Multiple Input Multiple Output (MIMO) Communication Systems and Methods for Chip to Chip and Intrachip Communication", U.S. Appl. No. 62/032,027, filed Aug. 1, 2014, 19 pages.

Whatmough, Paul N. et al., "VLSI Architecture for a Reconfigurable Spectrally Efficient FDM Baseband Transmitter," IEEE Transactions on Circuits and Systems I: Regular Papers, IEEE, vol. 59, No. 5, May 1, 2012, pp. 1107-1118.

Hunger, R., "Analysis and Transceiver Design for the MIMO Broadcast Channel," Foundations in Signal Processing, Communications and Networking, vol. 8, Springer, 2013, pp. 13-16.

International Search Report and Written Opinion for PCT/US2015/042412, mailed Oct. 26, 2015, 12 pages.

\* cited by examiner

Power Allocation Algorithm

MULTIPLE INPUT MULTIPLE OUTPUT (MIMO) COMMUNICATION SYSTEMS AND METHODS FOR CHIP TO CHIP AND INTRACHIP COMMUNICATION

PRIORITY CLAIM

The present application claims priority to U.S. Provisional Patent Application Ser. No. 62/032,027 filed on Aug. 1, 2014, and entitled "MULTIPLE INPUT MULTIPLE OUTPUT (MIMO) COMMUNICATION SYSTEMS AND METHODS FOR CHIP TO CHIP AND INTRACHIP COMMUNICATION," which is incorporated herein by reference in its entirety.

BACKGROUND

I. Field of the Disclosure

The technology of the disclosure relates generally to communication techniques between chips or between dies within a package.

II. Background

Computing devices have become common in modern society. The prevalence of such computing devices may be attributed to the many functions that are enabled within such computing devices. Increasingly complex integrated circuits have been designed and manufactured to provide increasingly greater functionality. Concurrent with the increases in complexity of the integrated circuits, there has been pressure to decrease the area consumed by the integrated circuits.

In many instances the computing devices include a mother board with several integrated circuits communicatively coupled to one another through conductive elements referred to as buses. Signals are passed from one integrated circuit to a second integrated circuit over such buses. As the complexity of the integrated circuits increases, the number of conductive elements required to convey signals between the integrated circuits typically increases. Likewise, as the amount of data increases, the frequencies at which the data is transmitted increase. As the number of conductive elements increases and the frequencies increase, the opportunities for signals to interfere with one another increases. This interference is commonly referred to as electromagnetic interference (EMI) or crosstalk. If the EMI is too severe, undesirable errors may be introduced into the signal stream. While of concern for communication between two integrated circuits, EMI concerns also exist for communications that take place between two dies within a single integrated circuit package.

Historically, each conductive element was treated as being functionally independent of other conductive elements even when the conductive elements were proximate one another, such that crosstalk could occur. Because activity on one conductive element frequently does impact other conductive elements, designers would appreciate the ability to model the conductive elements more effectively so as to create more efficient communication schemes for communication between integrated circuits or between dies of a single integrated circuit package.

SUMMARY OF THE DISCLOSURE

Aspects disclosed in the detailed description include multiple input multiple output (MIMO) communication systems and methods for chip to chip and intrachip communication. In exemplary aspects, MIMO techniques that have been applied to wireless communication systems are applied to interchip and intrachip communication systems. In particular, a transfer function is applied at a transmitter, and a reverse transfer function is applied at a receiver. The transfer function dynamically changes based on channel conditions to cancel or otherwise mitigate electromagnetic interference (EMI) and crosstalk conditions. In an exemplary aspect, a sum of power levels across the channels may have a maximum. To abide by such power level constraint, the transfer function may be optimized to reduce interference while remaining within the power level constraint.

In this regard in one aspect, a method of facilitating communication over a plurality of conductive elements that communicatively couple a transmitter and a receiver is disclosed. The method comprises modeling a plurality of conductive elements as a channel matrix. The method also comprises evaluating channel state information (CSI) for the channel matrix. The method also comprises determining a sum power constraint. The method also comprises calculating a transfer function based on based on the sum power constraint. The method also comprises applying the transfer function to transmissions from a transmitter to a receiver.

In another aspect, an integrated circuit (IC) package is disclosed. The IC package comprises a first die comprising a transmitter. The IC package also comprises a second die comprising a receiver. The IC package also comprises a plurality of conductive elements coupling the transmitter to the receiver. The IC package also comprises a control system associated with the transmitter. The control system is configured to model the plurality of conductive elements as a channel matrix. The control system is also configured to evaluate CSI for the channel matrix. The control system is also configured to determine a sum power constraint. The control system is also configured to calculate a transfer function based on the sum power constraint. The control system is also configured to apply the transfer function to transmissions from the transmitter to the receiver.

In another aspect, a chip to chip communication system is disclosed. The chip to chip communication system comprises a first chip comprising a transmitter. The chip to chip communication system also comprises a second chip comprising a receiver. The chip to chip communication system also comprises a plurality of conductive elements coupling the transmitter to the receiver. The chip to chip communication system also comprises a control system associated with the transmitter. The control system is configured to model the plurality of conductive elements as a channel matrix. The control system also is configured to evaluate the CSI for the channel matrix. The control system is also configured to determine a sum power constraint. The control system is also configured to calculate a transfer function based on the sum power constraint. The control system is also configured to apply the transfer function to transmissions from the transmitter to the receiver.

In another aspect, a method of facilitating communication over a plurality of conductive elements that communicatively couple a transmitter and a receiver is disclosed. The method comprises modeling a plurality of conductive elements as a channel matrix. The method also comprises evaluating CSI for the channel matrix. The method also comprises determining a sum power constraint. The method also comprises calculating a transfer function. The method also comprises positioning a transmitter and a receiver within a die on an IC package. The method also comprises applying the transfer function to transmissions from the transmitter to the receiver.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include multiple input multiple output (MIMO) communication systems and methods for chip to chip and intrachip communication. In exemplary aspects, MIMO techniques that have been applied to wireless communication systems are applied to interchip and intrachip communication systems. In particular, a transfer function is applied at a transmitter, and a reverse transfer function is applied at a receiver. The transfer function dynamically changes based on channel conditions to cancel or otherwise mitigate electromagnetic interference (EMI) and crosstalk conditions. In an exemplary aspect, a sum of power levels across the channels may have a maximum. To abide by such power level constraint, the transfer function may be optimized to reduce interference while remaining within the power level constraint.

Figure 1:
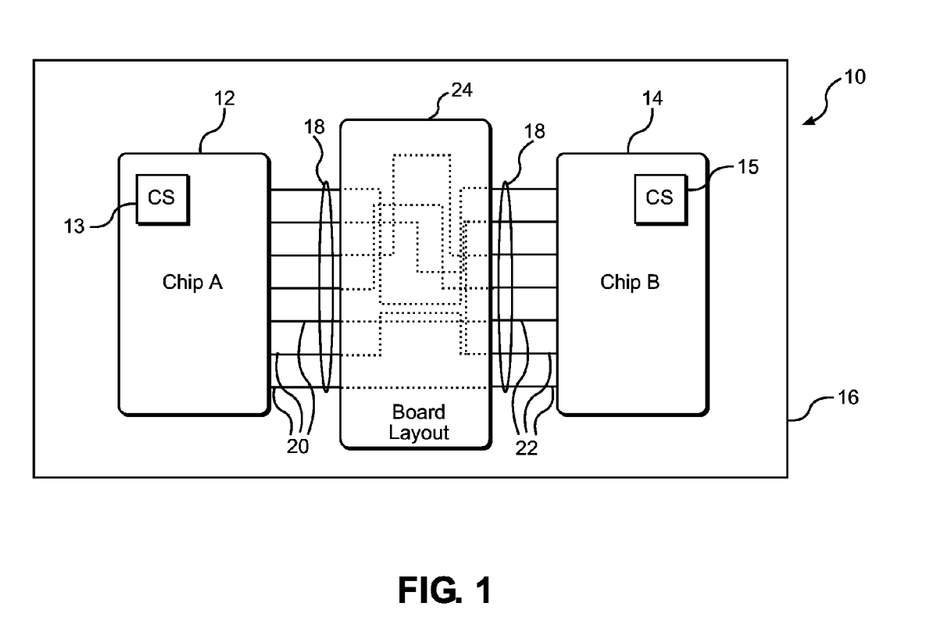
FIG. 1 is a block diagram of an exemplary chip to chip communication system that may benefit from exemplary aspects of the present disclosure.

In this regard, FIG. 1 is block diagram of an exemplary interchip communication system 10 that may benefit from exemplary aspects of the present disclosure. The interchip communication system 10 may include a first integrated circuit (IC) or chip 12 having a control system (CS) 13 and a second IC or chip 14 having a control system 15. The chips 12, 14 may be positioned on a printed circuit board (PCB) 16, such as through soldering or the like. The chips 12, 14 are communicatively coupled by conductive elements 18 (sometimes referred to as channels). The first chip 12 is coupled to conductive elements 18 by pins or contacts 20. Similarly, the second chip 14 is coupled to conductive elements 18 by pins or contacts 22. It should be appreciated that the conductive elements 18 may be routed between first chip 12 and second chip 14 by routing software so as to minimize distances traveled while providing space for other elements (e.g., other chips, inductors, capacitors, or the like) on the PCB 16. The routing of the conductive elements 18 is generally noted as board layout 24. Note that even with the assistance of routing software, the board layout 24 may include some conductive elements 18 that are randomly routed proximate one another.

The proximity of conductive elements 18 to each other in board layout 24 allows signals on a particular channel to act as EMI aggressors with respect to other channels or be the victim of other aggressors in board layout 24.

Figure 2:
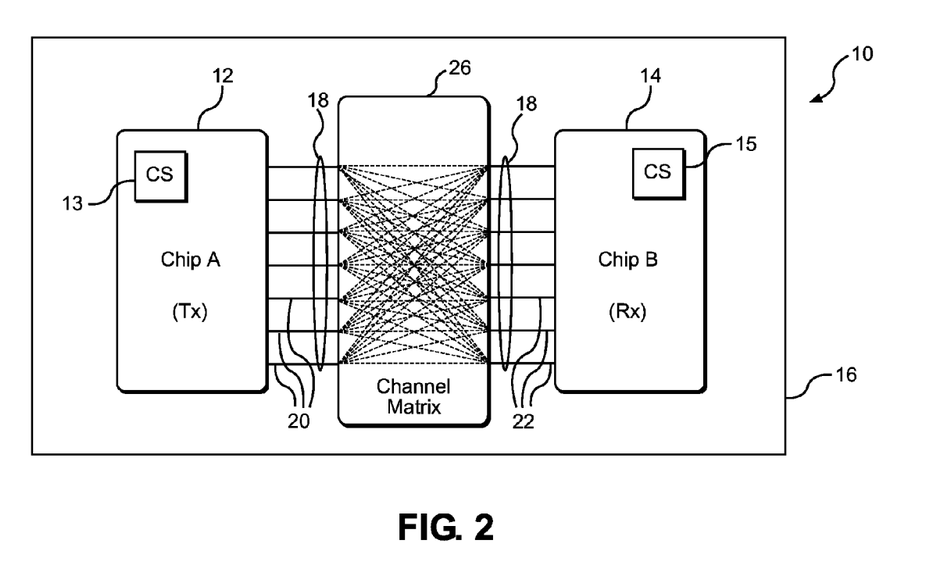
FIG. 2 is a block diagram of a channel model of the chip to chip communication system of FIG. 1.

In this regard, the crosstalk of the channels on the conductive elements 18 may be modeled as a channel matrix 26 as better illustrated in FIG. 2. As modeled, the first chip 12 is a transmitter (Tx), and the second chip 14 is a receiver (Rx). Further, as modeled, each pin 20 is communicatively coupled to each pin 22 to varying degrees by virtue of EMI and crosstalk between the conductive elements 18.

Without the benefit of exemplary aspects of the present disclosure, communication between the first chip 12 and the second chip 14 suffers from crosstalk. Further, impedance mismatches may cause reflections on the conductive elements 18. Still further distortions in the signals may be introduced due to limited bandwidth. Further errors may be introduced from jitter at high speeds. However, by treating the channels of the conductive elements 18 as interdependent instead of independent, MIMO solutions may be applied to the interchip communication system 10 so as to form vectorized signaling using eigenvector beamforming at the transmitter and combining at a receiver within the interchip communication system 10. Such MIMO solutions help eliminate or, at least, mitigate the effects caused by crosstalk, reflections, limited bandwidth, and jitter. In exemplary aspects of the present disclosure, orthogonal frequency division multiplexing (OFDM) may be used with the MIMO solutions so as to allow for frequency selective channels.

Figure 3:
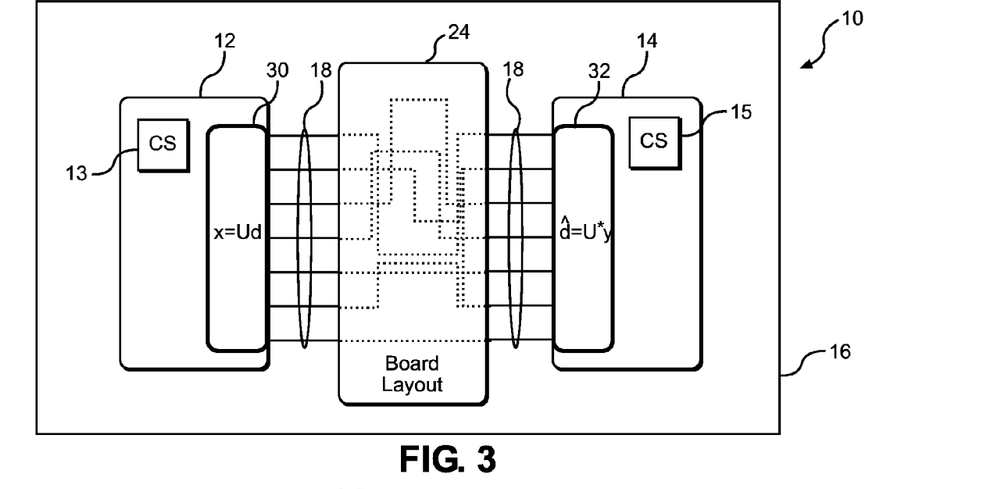
FIG. 3 is a block diagram of a chip to chip communication system with transfer function and reverse transfer function according to exemplary aspects of the present disclosure.

In this regard, FIG. 3 illustrates an expanded block diagram of the interchip communication system 10 where the first chip 12 acts as the transmitter and the second chip 14 acts as the receiver. The first chip 12 includes a transfer function module 30. Likewise, the second chip 14 includes an inverse transfer function module 32. The transfer function module 30 and inverse transfer function module 32 may be implemented in hardware, software, or a combination of the two. In an exemplary aspect of the present disclosure, the transfer function may be applied to the signal by precoding in the transmitter of the first chip 12.

To ascertain the transfer function applied by the transfer function module 30, a bit of math is performed as follows. For the purposes of this aspect, it is assumed that the sum of the power on the conductive elements 18 is constrained and an optimal solution is sought to minimize errors while obeying the power constraint. In particular, the signal received at the second chip 14 may be expressed as:

$$y = Hx + z \tag{Eq. 1}$$

where y is the received column vector (i.e., the signal received at pins 22), x is the transmitted column vector (i.e., the signal initiated at pins 20), and H is the NxN channel matrix. As noted, the transmit signal has a sum power constraint of the form:

$$E[x^\dagger x] \leq NP \tag{Eq. 2}$$

The capacity of such a system is given by $$C_{sum} = \sum_{i=1}^{N} \log\left(1 + \frac{\lambda_i^2 P_i}{\sigma^2}\right) \tag{Eq. 3}$$

where $\{\lambda_1, \lambda_2, \ldots \lambda_N\}$ are the eigenvalues of the channel matrix H.

The capacity-maximizing transmit signal, for a known channel state information (CSI), is given by:

$$x = Ud \quad \text{(Eq. 4)}$$

where U is derived by the singular value decomposition (SVD) of H as $$H = U\Delta U^* \quad \text{(Eq. 5)}$$

d is the independent identically distributed (i.i.d.) data column vector that represents the information to be transmitted with additional power allocation to the transmit signal.

Figure 4:
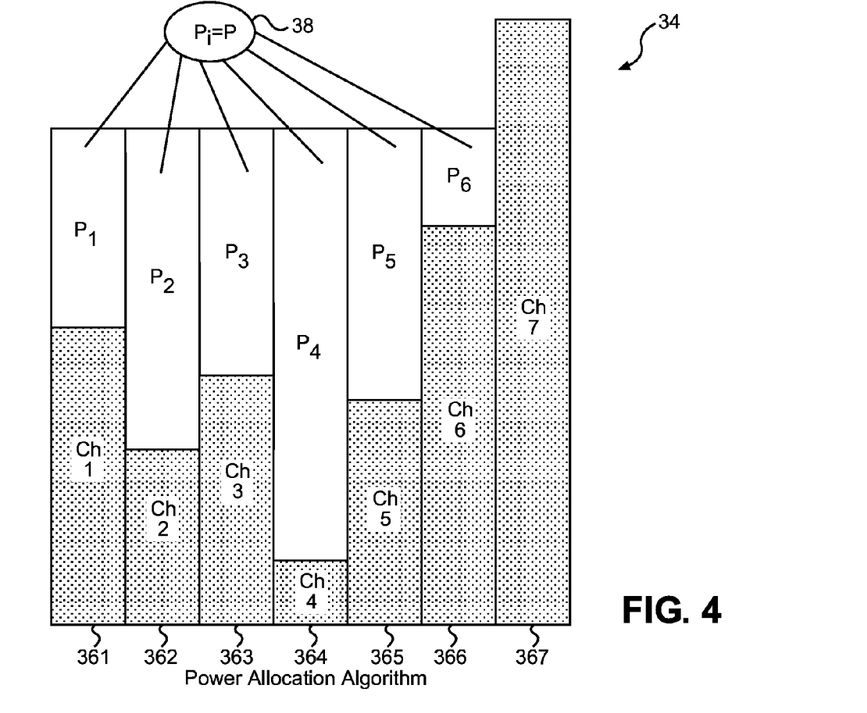
FIG. 4 is graph of a power allocation algorithm that fills the channels with power according to the algorithm.

In general, the sum power constraint is illustrated by graph 34 of FIG. 4, where the heights of the channels $36_1$-$36_7$ are inversely proportional to their individual signal to noise ratios (SNR). The sum power constraint 38 is P, so the sum of the power allocated to each channel is P, so power is allocated to $P_1$-$P_6$ such that the sum of $P_i$=P. Power may be allocated in direct proportion to the SNRs. Some channels with extremely low SNRs are allocated zero power (i.e., not used). Minor variations in power allocation to accommodate priority messages and the like may also be used so long as the overall sum power constraint is obeyed.

The optimal power allocations $\{P_1, P_2, \ldots P_N\}$ can be found by waterfilling over the eigenvalues such that:

$$\Sigma_{i=1}^{N} P_i \leq NP \quad \text{(Eq. 6)}$$

In essence, waterfilling allocates more power to channels with better conditions. For more information about waterfilling, the interested reader is directed to pages 183-185 and 204-209 of *Fundamentals of Wireless Communication*, by D. Tse and P. Viswanath, 2005, Cambridge University Press, also available at www.eecs.berkeley.edu/~dtse/book.html, which is hereby incorporated by reference in its entirety.

The above formulation of the waterfilling algorithm only serves as an example. There are a variety of related methods. For instance, (Eq. 3) cites Shannon Capacity in a MIMO system. The practical system may be more complicated. The data rate to SINR (Signal to Interference plus Noise Ratio) function may not be strictly logarithmic, but it may show concavity in general, namely, the marginal benefit in data rate from increasing SINR diminishes at high SINR. The essence of waterfilling is to equalize the marginal benefit in data rate from allocating more power to all the eigen-modes. There are numerous variations to the waterfilling algorithm. The general trend is that a stronger eigen-mode is allocated no less power than a weaker one. This, compounded with the fact that the stronger eigen-mode attain higher data rate than a weaker one with the same transmit power, shows that with waterfilling-like algorithm, the data rate on the stronger eigen-mode is higher.

Due to the concavity of data rate as a function of SINR, an approximation to waterfilling is equal power allocation in high SINR domain. This is justified by assuming that the difference in the marginal benefit among different eigen-mode is small at high SINR. Note that with the equal power allocation, data rate is higher in the stronger eigen-mode.

Another approximation is greedy-filling in which as much power is provided to the strongest remaining eigen-mode. This is justified by assuming the SINR is low so that the difference in marginal benefit does not decrease with SINR in the low SINR region.

The ideal receiver performs according to:

$$\hat{d} = U^* y \quad \text{(Eq. 7)}$$

The complexity of the ideal transmit vector of Eq. 4 can be traded off with capacity gains. Thus, as illustrated in FIG. 3, the transfer function module 30 implements Eq. 4 and the inverse transfer function module 32 implements Eq. 7.

Note that instead of a sum-power constrained optimum solution, an optimum solution may also be generated for an individual power constrained system. The math is similar except instead of Eq. 2, the transmit signal has an individual power constraint of the form:

$$E[x_i x_i^*] \leq P \quad \text{(Eq. 8)}$$

The rest of the equations remain substantially the same.

While aspects of the present disclosure are well suited for interchip communication system 10, the present disclosure is not so limited and may also be used for intrachip communication, such as when an integrated circuit package has two or more dies contained therein. The premise of using MIMO techniques with waterfilling remains the same.

Figure 5:
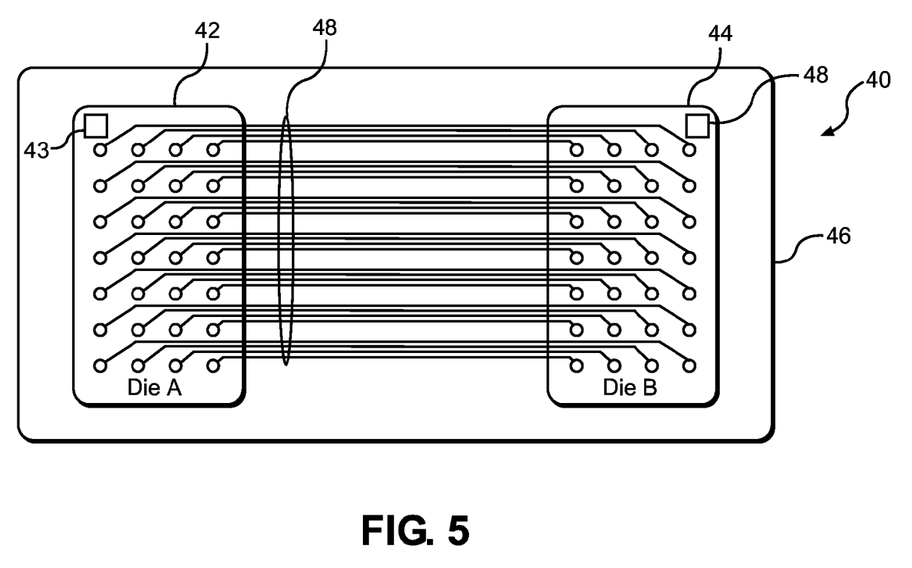
FIG. 5 is a block diagram of an exemplary integrated circuit package with two dies therein that may benefit from exemplary aspects of the present disclosure.
Figure 6:
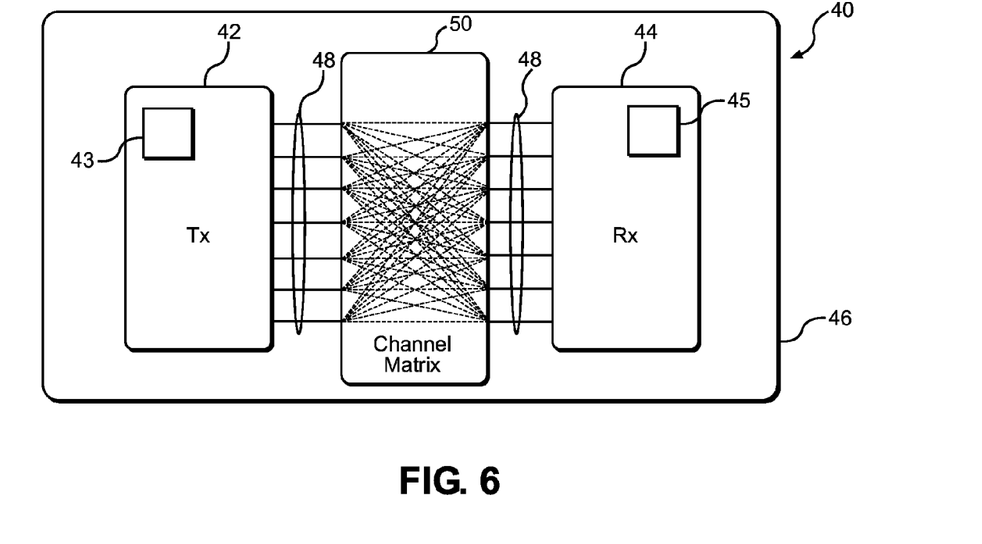
FIG. 6 is a block diagram of a channel model of the intrachip communication system of FIG. 5.

In this regard, FIG. 5 illustrates an intrachip communication system 40 with a first die 42 having a control system 43 and a second die 44 having a control system 45 positioned within an integrated circuit package 46. The first die 42 is communicatively coupled to the second die 44 via conductive elements 48. The conductive elements 48 may be modeled as a channel matrix 50, as better illustrated in FIG. 6.

Figure 7:
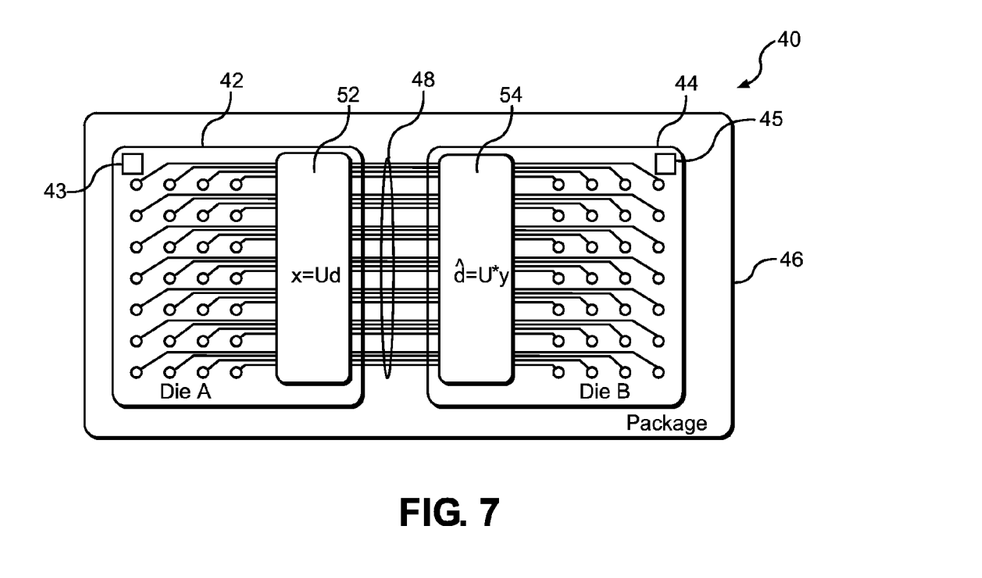
FIG. 7 is a block diagram of an intrachip communication system with transfer function and reverse transfer function according to exemplary aspects of the present disclosure.

As with the interchip communication system 10 of FIGS. 1-3, the first die 42 may include a transfer function module 52 and the second die 44 may include an inverse transfer function module 54 as illustrated in FIG. 7. The math to determine the transfer function and the inverse transfer function is set forth above in Eq. 1-7 (and/or Eq. 8 if there is an individual power constraint).

Note further, that while it is assumed that first chip 12 and first die 42 act as the transmitter and the second chip 14 and the second die 44 act as the receiver, communication may be bi-directional and the second chip 14 and second die 44 may be transmitters and may have transfer modules (not illustrated) while first chip 12 and first die 42 may be receivers and have inverse transfer modules (not illustrated) as needed or desired.

Figure 8:
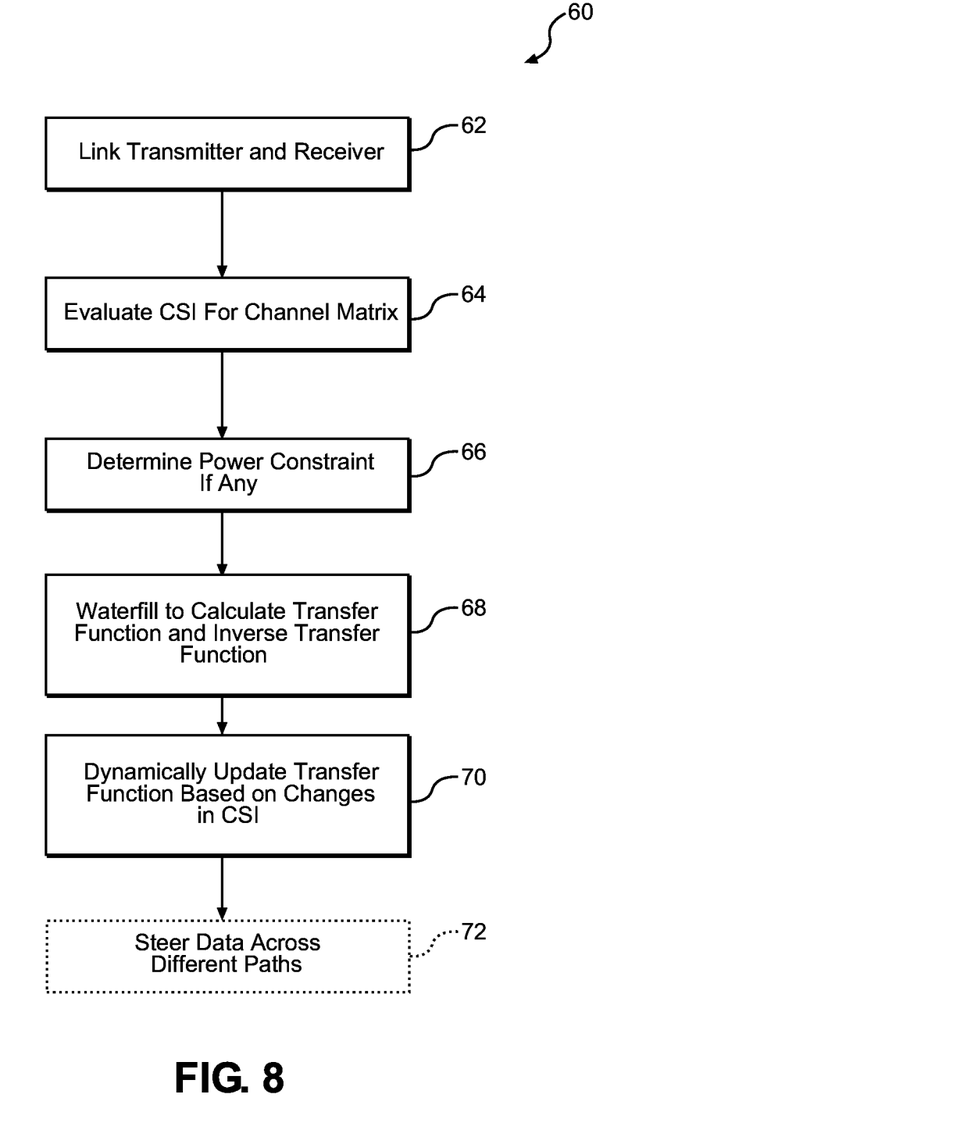
FIG. 8 is a flowchart illustrating an exemplary process for generating a transfer function to apply to transmissions in an interchip or intrachip communication system.

A summary of the processes used by exemplary aspects of the present disclosure is presented in a flow chart in FIG. 8. In particular, process 60 begins with the transmitter and receiver being linked (block 62). In exemplary aspects, the transmitter may be the first chip 12 or the first die 42 and the receiver may be the second chip 14 or the second die 44 (although as noted, in bi-directional communications, the second chip 14 and the second die 44 may also be transmitters as well). The link is established through conductive elements 18 or 48.

With continued reference to FIG. 8, the process 60 continues by evaluating the CSI to determine a current channel matrix (block 64). Note that CSI may be known a priori since the chip layout is known in advance and the CSI for a given chip layout may be calculated empirically or through a model. Further, an initial CSI may be evaluated by performing a boot time calibration. Evaluation of the CSI may be done periodically to adjust for changing CSI. A control system (such as control system 13 or 43) may determine which, if any, power constraint applies to the communication system 10, 40 (block 66). For example, the power constraint could be a sum power constraint or an individual power constraint.

With continued reference to FIG. 8, the process 60 continues by waterfilling to calculate a transfer function and inverse transfer function (block 68). The transfer function and inverse transfer function are loaded into the appropriate transfer function module 30, 52 or inverse transfer function module 32, 54. The control system may dynamically update the transfer function and inverse transfer function based on changes in the CSI (block 70).

Note that a further advantage of using MIMO techniques with interchip communication system 10 or intrachip communication system 40 is the beamforming aspects of MIMO may be used to "steer" signals between pins that are not physically connected to one another. For example, if a first pin 20 is coupled to a first pin 22, but not to a second pin 22, a signal may still be routed from first pin 20 to the second pin 22 by changing the transfer function. In effect, a positive aspect of crosstalk is used to piggyback the signal at the first pin 20 to the second pin 22. This steering may be done without having to change any physical routing of conductive elements 18, 48. With continued reference to FIG. 8, such optional steering of data across different paths may also be performed (block 72).

The MIMO communication systems and methods for chip to chip and intrachip communication according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 9:
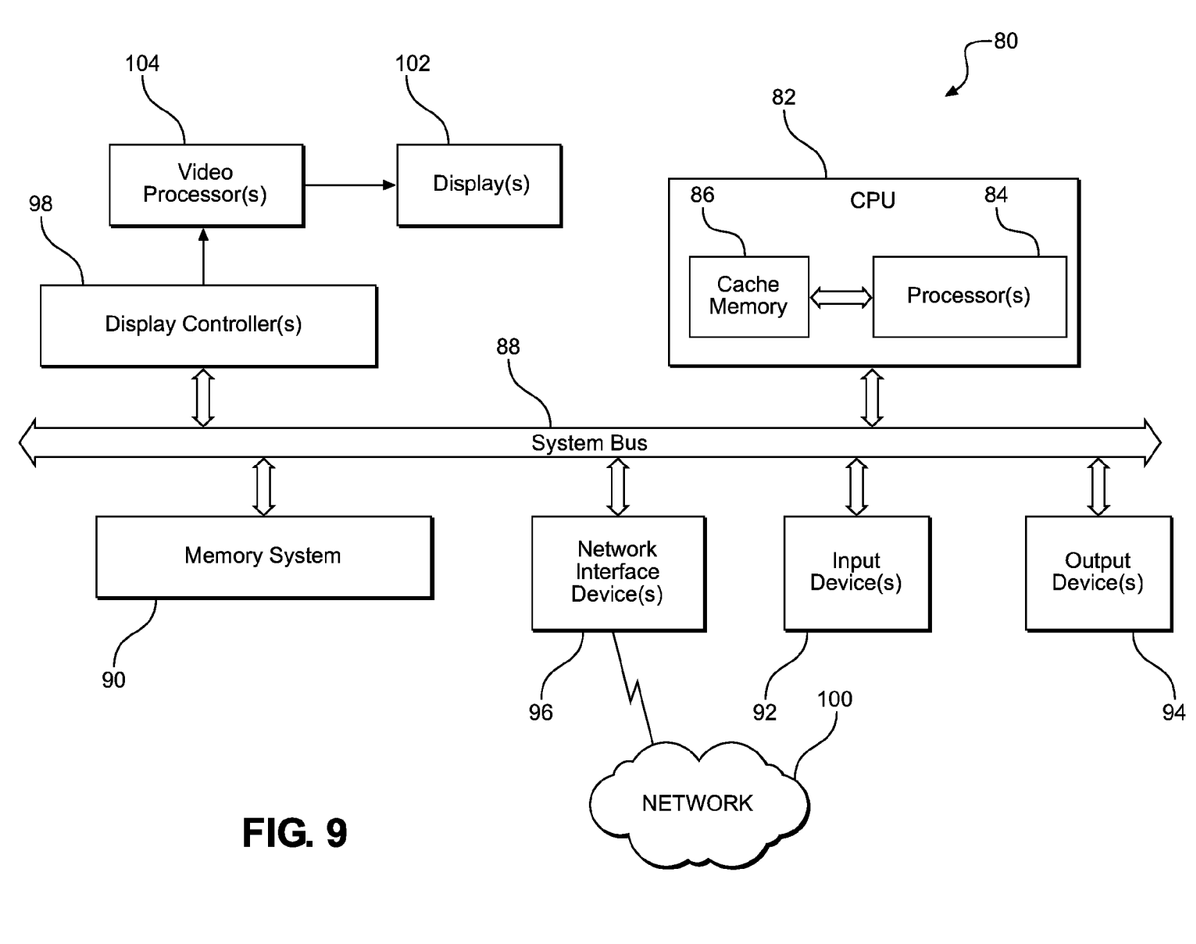
FIG. 9 is a block diagram of an exemplary processor-based system that can include the interchip communication system of FIG. 3 or the intrachip communication system of FIG. 7.

In this regard, FIG. 9 illustrates an example of a processor-based system 80 that can employ interchip communication system 10 or intrachip communication system 40 illustrated in FIGS. 1-7. In this example, the processor-based system 80 includes one or more central processing units (CPUs) 82, each including one or more processors 84. The CPU(s) 82 may have cache memory 86 coupled to the processor(s) 84 for rapid access to temporarily stored data. The CPU(s) 82 is coupled to a system bus 88 and can intercouple devices included in the processor-based system 80. As is well known, the CPU(s) 82 communicates with these other devices by exchanging address, control, and data information over the system bus 88. For example, the CPU(s) 82 can communicate bus transaction requests to the memory system 90. Although not illustrated in FIG. 9, multiple system buses 88 could be provided.

Other devices can be connected to the system bus 88. As illustrated in FIG. 9, these devices can include a memory system 90, one or more input devices 92, one or more output devices 94, one or more network interface devices 96, and one or more display controllers 98, as examples. The input device(s) 92 can include any type of input device, including but not limited to input keys, switches, voice processors, etc. The output device(s) 94 can include any type of output device, including but not limited to audio, video, other visual indicators, etc. The network interface device(s) 96 can be any devices configured to allow exchange of data to and from a network 100. The network 100 can be any type of network, including but not limited to a wired or wireless network, private or public network, a local area network (LAN), a wide local area network, wireless local area network, BLUETOOTH®, and the Internet. The network interface device(s) 96 can be configured to support any type of communication protocol desired.

The CPU(s) 82 may also be configured to access the display controller(s) 98 over the system bus 88 to control information sent to one or more displays 102. The display controller(s) 98 sends information to the display(s) 102 to be displayed via one or more video processors 104, which process the information to be displayed into a format suitable for the display(s) 102. The display(s) 102 can include any type of display, including but not limited to a cathode ray tube (CRT), a liquid crystal display (LCD), light emitting diode (LED), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. The processor may be a microprocessor, but in the alternative, the processor may be any conventional processor, controller, microcontroller, or state machine. The processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of facilitating communication over a plurality of conductive elements that communicatively couple a transmitter and a receiver, the method comprising:
   modeling a plurality of conductive elements as a channel matrix;
   evaluating channel state information (CSI) for the channel matrix;
   determining a sum power constraint;
   calculating a transfer function based on the sum power constraint;
   applying the transfer function to transmissions from a transmitter to a receiver; and
   dynamically transmitting to different elements on the receiver without changing physical routing.

2. The method of claim 1, further comprising dynamically updating the transfer function based on a changing CSI.

3. The method of claim 1, further comprising receiving the transmissions from the transmitter at the receiver.

4. The method of claim 3, further comprising applying an inverse transfer function at the receiver.

5. The method of claim 1, further comprising positioning the transmitter within a first chip.

6. The method of claim 5, further comprising coupling the plurality of conductive elements to the transmitter using pins.

7. The method of claim 1, further comprising positioning the transmitter within a die on an integrated circuit (IC) package.

8. The method of claim 1, wherein calculating the transfer function based on the sum power constraint comprises using waterfilling and using the waterfilling further comprises mitigating crosstalk among signals on the plurality of conductive elements.

9. The method of claim 1, further comprising using an orthogonal frequency division multiplexing scheme with the transfer function.

10. The method of claim 1, wherein calculating the transfer function comprises using waterfilling to calculate the transfer function.

11. An integrated circuit (IC) package comprising: a first die comprising a transmitter; a second die comprising a receiver; a plurality of conductive elements coupling the transmitter to the receiver; and a control system associated with the transmitter, the control system configured to: model the plurality of conductive elements as a channel matrix; evaluate channel state information (CSI) for the channel matrix; determine a sum power constraint; calculate a transfer function based on the sum power constraint; and apply the transfer function to transmissions from the transmitter to the receiver; wherein the control system is further configured to transmit dynamically to different elements on the receiver without changing physical routing.

12. The IC package of claim 11, wherein the receiver is configured to apply an inverse transfer function on signals received from the transmitter.

13. The IC package of claim 11, wherein the control system is further configured to mitigate crosstalk among signals on the plurality of conductive elements.

14. The IC package of claim 11, wherein the control system is further configured to use an orthogonal frequency division multiplexing scheme with the transfer function.

15. The IC package of claim 11 integrated into a device selected from the group consisting of: a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

16. A chip to chip communication system comprising:
   a first chip comprising a transmitter;
   a second chip comprising a receiver;
   a plurality of conductive elements coupling the transmitter to the receiver; and
   a control system associated with the transmitter, the control system configured to:
      model the plurality of conductive elements as a channel matrix;
      evaluate channel state information (CSI) for the channel matrix;
      determine a sum power constraint;
      calculate a transfer function based on the sum power constraint;
      apply the transfer function to transmissions from the transmitter to the receiver; and
      dynamically transmit to different elements on the receiver without changing physical routing.

17. The chip to chip communication system of claim 16, wherein the receiver is configured to apply an inverse transfer function on signals received from the transmitter.

18. The chip to chip communication system of claim 16, wherein the control system is further configured to mitigate crosstalk among signals on the plurality of conductive elements.

19. The chip to chip communication system of claim 16, wherein the control system is further configured to use an orthogonal frequency division multiplexing scheme with the transfer function.

20. The chip to chip communication system of claim 16 integrated into a device selected from the group consisting of: a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

21. A method of facilitating communication over a plurality of conductive elements that communicatively couple a transmitter and a receiver, the method comprising: modeling a plurality of conductive elements as a channel matrix; evaluating channel state information (CSI) for the channel matrix;

determining a sum power constraint; calculating a transfer function; positioning a transmitter and a receiver within a die on an integrated circuit (IC) package; and applying the transfer function to transmissions from the transmitter to the receiver; and dynamically transmitting to different elements on the receiver without changing physical routing.

22. The method of claim 21, further comprising dynamically updating the transfer function based on a changing CSI.

23. The method of claim 21, further comprising receiving the transmissions from the transmitter at the receiver.

24. The method of claim 23, further comprising applying an inverse transfer function at the receiver.

* * * * *